United States Patent
Routh et al.

[15] 3,649,951
[45] Mar. 14, 1972

[54] END INSULATOR FOR A POWER DISTRIBUTION SYSTEM

[72] Inventors: Larry L. Routh, Castro Valley; James Contratto, Livermore, both of Calif.

[73] Assignee: U.S. Industries, Inc., New York, N.Y.

[22] Filed: June 1, 1970

[21] Appl. No.: 42,197

[52] U.S. Cl. .............................................339/21 R, 339/24
[51] Int. Cl. ...............................................................H01r 9/00
[58] Field of Search ....................339/21, 22, 23, 24; 174/59, 174/22

[56] References Cited

UNITED STATES PATENTS

| | | | |
|---|---|---|---|
| 2,680,233 | 6/1954 | McFarlin | 339/21 R |
| 3,061,810 | 10/1962 | Boyd | 339/22 |
| 3,207,839 | 9/1965 | Voly | 174/72 |
| 3,496,518 | 2/1970 | Neumann et al. | 339/21 R |
| 3,094,584 | 6/1963 | Liberman et al. | 174/59 |

Primary Examiner—Marvin A. Champion
Assistant Examiner—Robert A. Hafer
Attorney—Joseph B. Gardner

[57] ABSTRACT

An end insulator for a power distribution system of the type providing an essentially continuous convenience outlet enabling electrical plugs to be connected thereto at substantially any selected location therealong. The system includes one or more elongated track assemblies that provide such convenience outlet, and each such track assembly comprises a rigid metal track or channel component equipped along its length with a conductor assembly having a plurality of spaced-apart electric conductors supported by an open-ended insulating carrier that electrically isolates the conductors one from another and from the metal track. The end insulator is connectable with a track assembly at an end thereof so as to overlie the otherwise exposed ends of the conductors thereof, and the end insulator may take the form either of a dead end closure having a transverse wall generally corresponding in external dimensions and in cross-sectional area to the associated end of the track assembly so as to substantially cover the same, or of an end connector similar to the dead end closure but having a large opening through its transverse wall to permit insertion therethrough of a portion of a splice box used to join successive track assemblies or of a live end closure used to attach a junction box thereto and within which the conductors of the distribution system are connected with power supply lines. In addition to its transverse wall, each end insulator has a flange extending longitudinally therefrom for telescopic engagement with the track assembly intermediate the rigid metal track and conductor assembly carried thereby.

10 Claims, 5 Drawing Figures

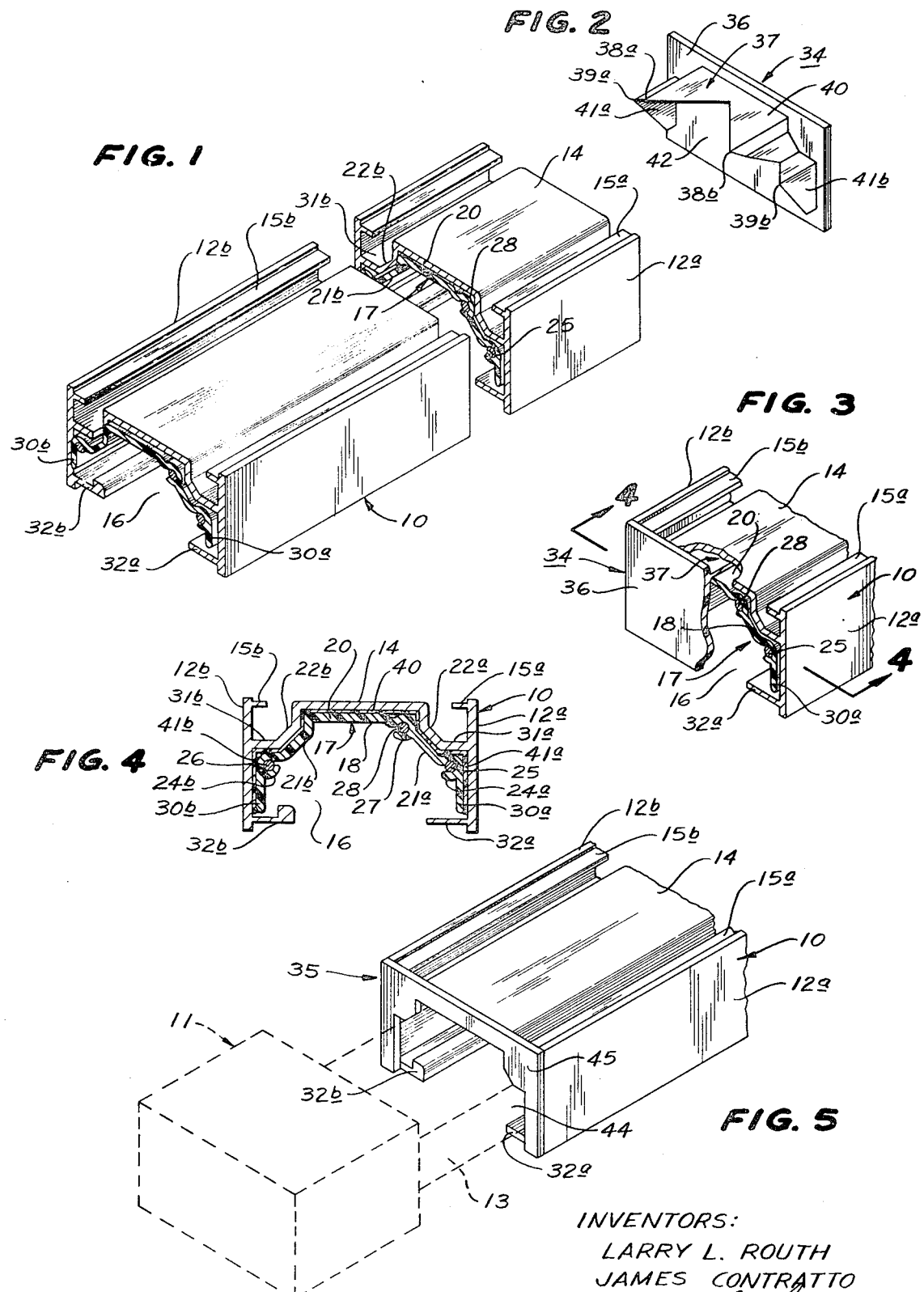

END INSULATOR FOR A POWER DISTRIBUTION SYSTEM

This invention relates to a power distribution system and, more particularly, to an end insulator for a power distribution system having one or more track assemblies comprising a rigid metal track equipped along its length with a conductor assembly providing a plurality of spaced apart electric conductors supported by an open-ended insulating carrier. The end insulator is engageable with such assembly at an end thereof to overlie the otherwise exposed ends of the conductors thereof so as to electrically insulate the same.

As explained in the copending patent application of Larry L. Routh entitled "POWER DISTRIBUTION SYSTEM," Ser. No. 695,655, filed Jan. 4, 1968, now U.S. Pat. No. 3,529,274 an electric power distribution system having fixed points of connection thereto is often unsatisfactory especially in commercial and industrial buildings since the use of any particular space therein is not necessarily static and any change in use may require relocation of the various outlets and other points of connection which essentially requires rewiring if such points of connection are not movable. In view of this, power distribution systems have been proposed heretofore which are intended to afford a degree of flexibility as respects the location of any lights and other electrically operated fixtures or devices that may be connected thereto. Such systems usually include one or more track assemblies having a substantially continuous open-mouthed chamber therealong defining a convenience outlet enabling electric plugs or adaptors to be connected thereto at substantially any selected location therealong.

A difficulty with most of these prior power distribution systems affording such flexibility is that interconnection of the receptacle-equipped track assemblies thereof (or connection of an end of one component with power supply lines) is effected by splice boxes or other end closures requiring special connector arrangements at the ends of the track assemblies. As a consequence, it is very difficult to interconnect successive track components unless they are of standard length and equipped with such special connector arrangements at the ends thereof at the time of their manufacture. Clearly, this requirement imposes limitation on the use of the systems since in most instances in which standard lengths cannot be employed, it is usually necessary to have special or custom lengths made to order. In view of this, an improved power distribution system of the type affording substantially infinite selection of the location along the length thereof at which light and other electrically operated devices can be connected thereto has been developed, and a specific instance thereof is disclosed in the copending patent application of Larry L. Routh and James Contratto entitled "END CONNECTOR FOR A POWER DISTRIBUTION SYSTEM," Ser. No. 19,660, filed Mar. 16, 1970.

In such improved system the track assemblies, which each comprise a rigid metal track or channel component and a conductor assembly extending therealong and including a plurality of conductors supported by an insulating carrier, can be cut at the site of their installation to any requisite length and used with standard connectors. Cutting the track assembly to length includes cutting the rigid metal track or channel component thereof together with the insulating carrier of the conductor assembly and the conductors themselves, thereby causing the conductors to have exposed terminal ends adjacent the end of each track assembly. In certain instances, this condition is believed undesirable and in many cases electrical building codes require that the exposed ends of the conductors be insulated in some manner.

In view of the foregoing, an object, among others, of the present invention is to provide an end insulator cooperative with such track assemblies at the ends thereof so as to insulate the terminal ends of the conductors forming a part thereof. Another object of the invention is that of providing an end insulator having a transverse wall generally corresponding in external dimensions and in cross-sectional area to the associated end of a track assembly so as to overlie the ends of the conductors carried thereby and cover the same with a good dielectric material.

Still another object is in the provision of an end insulator of the character described having a transverse wall and a longitudinally extending flange projecting therefrom which is telescopically engageable with a track assembly so as to support the end insulator in position thereon. A further object is to provide an end insulator of the type set forth in which the flange thereof is telescopically insertable between the rigid metal track and the insulating carrier of such assembly so that the flange further serves to augment the electrical isolation of such conductors from the rigid metal track.

Yet a further object is that of providing an end insulator either in the form of a dead end closure engageable with a track assembly at a terminal end thereof so as to close the same, or of an end connector having a large opening through the transverse wall thereof to permit insertion therethrough of a portion of a splice box used to join successive track assemblies or of a live end closure used to attach a junction box within which the conductors of the distribution systems are connected with power supply lines. Additional objects and advantages of the invention, specially as concerns particular features and characteristics thereof, will become apparent as the specification continues.

Embodiments of the invention are illustrated in the accompanying drawing, in which:

FIG. 1 is a broken perspective view of a power distribution system embodying the invention;

FIG. 2 is a perspective view of an end closure used to terminate the end of a power distribution system by closing the same;

FIG. 3 is a broken perspective view illustrating the end closure shown in FIG. 2 in position to close the end of the distribution system depicted in FIG. 1;

FIG. 4 is a transverse sectional view taken along the line 4—4 of FIG. 3; and

FIG. 5 is a broken perspective view showing a modified form of end closure of a type permitting insertion of an end connector into the track component of a power distribution system, a typical end connector being indicated by broken lines.

The power distribution system partially illustrated in FIG. 1 may include a plurality of interconnected track assemblies 10, only one of which is shown, and they are each receptacle-equipped assemblies adapted to have one or more plugs or adaptors (not shown) connected therewith at various locations therealong. EAch such adaptor is usually associated with an electric fixture (not shown). The track assemblies may be used with end connectors that take the form either of a splice box or coupler used to interconnect successive track components or of a live end closure 11 by means of which the electric conductors forming a part of a succession of interconnected track assemblies are connected with power lines. Since such end connectors are not pertinent to the present invention the end closure 11 is illustrated in phantom lines only with its casing extension 13 projecting partially into a track assembly 10, but details concerning such end connectors may be found in our copending patent application Ser. No. 19,660, filed Mar. 16, 1970 and entitled "END CONNECTOR FOR A POWER DISTRIBUTION SYSTEM."

It may be observed that the entire power distribution system is polarized so that all of the elements thereof have a predetermined orientation, thereby resulting in particular polarities to be observed throughout the entire system. Although the polarization means employed is not pertinent to the present invention, it is convenient to note that apart from such polarization means the track assembly 10 is generally symmetrical about a vertical center line therethrough, as is best seen in FIG. 4; and in view of such general symmetry, the same numerals are employed to identify the oppositely positioned counterpart elements except that the suffixes "a" and "b" are added for purposes of differentiation therebetween.

Accordingly, and referring to FIGS. 1 and 2 in particular, the track assembly 10 is seen to include a rigid track or channel component having a pair of longitudinally extending and transversely spaced sidewalls 12a and 12b formed integrally with a longitudinally extending web 14 that is transversely disposed and projects between the side walls intermediate the tops and bottoms thereof. Adjacent their upper ends, the side walls 12 are turned inwardly to define flanges 15a and 15b that are used in securing the track assembly 10 to a ceiling or support means, not shown. The track assemblies 10 are intended to be joined in succession with other like track assemblies in a predetermined orientation so that circuit continuities are observed and maintained throughout the entire distribution system.

The track or channel component is provided with a chamber or receptacle 16 in underlying relation with the web 14, and such receptacle or chamber defines a longitudinally extending convenience outlet adapted to receive one or more adaptors therein. The chambers 16 adjacent its upper end in underlying relation with web 14 is provided with a conductor assembly denoted in general with the numeral 17. The conductor assembly 17 includes an elongated insulator or open-ended insulating carrier 18 having a web 20 of substantially the same general configuration as that of the track web 14 so as to be able to closely underlie the same, as illustrated in FIG. 4. Therefore, the web 20 is also provided with downwardly and outwardly inclined segments 21a and 21b respectively corresponding to the downwardly and outwardly inclined segments 22a and 22b of the track web 14.

The insulating carrier 18 is provided adjacent the lower outer ends of the inclined sections 21a and 21b thereof with longitudinally extending channel- or slot-forming sockets 24a and 24b respectively having conductors 25 and 26 mounted therein. Adjacent the upper end of the inclined section 21a at its mergence with the horizontal web section 20 another longitudinally extending channel- or slot-forming socket 27 is provided and it has a conductor 28 mounted therein. Each of the conductor-equipped slots 24 and 27 is provided with a restricted mouth confining the associated conductor therein and adapted to pass therethrough one of the contacts of an adaptor or of an end connector such as the live end closure 11 shown in FIG. 5. The conductors 25, 26 and 28 may be conventional copper wires (12 gage, for example), and they are effectively constrained against longitudinal displacements with respect to the open-ended insulating carrier 18 by the frictional grip of the respective sockets in which they are confined.

The carrier 18 is sufficiently rigid to be substantially self-sustaining and maintain the conductors in the spaced apart relationship shown and to confine the same within the slots or channels therefor. The carrier 18 is also equipped with depending legs 30a and 30b respectively extending downwardly from the channel members 24a and 24b, and such legs are substantially parallel to the sidewalls 12a and 12b of the track 10. Each leg 30 together with the associated slot portion or socket 24 has a vertical dimension slightly less than the distance between the horizontally oriented shoulders 31a and 31b respectively connecting the inclined sections 22a and 22b of the track web 14 with the sidewalls 12a and 12b and the respectively underlying inwardly turned flanges 332a and 32b that extend inwardly from the side walls 12a and 12b and are substantially parallel to the respectively facing shoulders 31a and 31b.

The legs 30 generally maintain the conductor assembly 17 in the approximate position or orientation shown but in the absence of an adaptor or of an end connector cooperatively engaging the track assembly 10, the connector assembly is free to move downwardly relative to the track until the lower extreminities of the legs 30 abut the inwardly turned flanges 32. Thus, the relative positions of the track component and conductor assemblies shown in FIG. 4 are those enforced by the presence of such an adaptor or end connector. Such relative dimensions of the legs 30 and spacing between the shoulders 31 and flanges 32 enable the conductor assembly 17 to fit rather loosely within the chamber 16 so that it is freely movable with respect thereto in longitudinal directions, thereby facilitating incorporation of the conductor assembly 17 within the rigid track or channel.

The conductor assembly 17 provides a plurality of circuits or pairs of conductors defining the same, and in the particular distribution system being considered there are two such circuits and, therefore, two pairs of conductors therefor. In more particular terms, the conductor 26 is common to each of the two circuits and conductor pairs and may be considered the neutral conductor. The conductors 25 and 28 are selectively associated with the neutral conductor 26, and the adaptors used in the system are characterized by being selectively connected to one or the other of such circuits, as explained in our copending patent application entitled "ADAPTOR FOR A POWER DISTRIBUTION SYSTEM," Ser. No. 808,335, filed Nov. 26, 1969. In the usual distribution system the potential defined between the neutral conductor 26 and either of the conductors 25 and 28 is of the order of 110 volts AC and the potential across the conductors 25 and 28 (which potential is not ordinarily used) is of the order of 220 volts AC.

As stated hereinbefore, for the purpose of enabling the receptacle-equipped track assemblies to be readily accommodated by rooms and installations irrespective of the dimensional restrictions thereof, it is practicably necessary for such track components to be cut to length at the site of their installation thereby requiring splice boxes and connector arrangements having no special structural characteristics associated with the track components which might be lost or destroyed upon cutting the same to custom or special lengths. The end connectors, such as the splice box 11, used in the system are so connectable with the receptacle-equipped track assemblies 10 irrespective of their being cut to any particular length. It will be appreciated that not only must the rigid track components be cut to appropriate length but the conductor assemblies 17 respectively carried thereby must also be cut to corresponding lengths. Accordingly, the conductors 25, 26 and 28 must terminate adjacent the open ends of the insulating carrier 18 supporting the same, and in the ordinary cases the track component 10, insulating carrier 18, and conductors all terminate in substantial alignment, as indicated best in FIGS. 1 and 3.

As a consequence, the ends of the conductors 25, 26 and 28 are exposed, as shown in FIG. 1, at the end of any track assembly 10 which in some environments might be considered hazardous. In order to obviate such occurance, an insulator may be used to cover or protect the otherwise exposed ends of the conductors 25, 26 and 28. Such an end insulator will take the form of a dead end closure 34 as shown in FIGS. 2, 3 and 4, or of an end connector 35 as shown in FIG. 5 which is able to pass the extension 13 of a live end closure 11 (or splice box) therethrough so that the terminals thereof can be engaged with the conductors 25, 26 and 28 of the track assembly 10. There is very little structural difference between the end insulators 34 and 35, but for convenience they will be considered separately herein.

Taking first the end insulator in the form of the dead end closure 34 illustrated best in FIG. 2, it is seen to be provided with a transverse wall 36 dimensioned to substantially abut an end of the rigid track component, as shown in FIG. 3. Accordingly, the transverse wall 36 generally corresponds in external dimensions and in area to the dimensions and cross-sectional area of an end of the track assembly 10 so as to substantially cover the same and define an end closure therefor. The transverse wall 36 is generally planar and is ordinarily quite stiff or rigid and may be formed from any one of the well-known synthetic plastics having good dielectric properties such as a polycarbonate. Since the voltages employed in the usual power distribution system of the type being considered are quite low, the transverse wall 36 may be relatively thin and, for example, may have a thickness or a few thousandths of an inch.

Formed integrally with the transverse wall 36 is a flange 37 projecting longitudinally therefrom for telescopic engagement with the track component 10 so as to relate the end insulator 34 thereto and enable the same to insulate the ends of the conductors 25, 26 and 28 adjacent and end of the track component and open-ended carrier 18 supported thereby. The flange 37 may have the same thickness as that of the transverse wall 36 but is often somewhat thinner and, as stated, it may be formed integrally with the transverse wall in which case it will constitute the same dielectric material.

The flange 37 telescopically engages the track assembly 10 and, more particularly, has an inverted somewhat U-shaped configuration substantially corresponding to the inverted generally U-shaped configuration of the track or channel component so as to be inserted thereinto, as shown in FIGS. 3 and 4. In more specific terms, the flanges 37 is inserted between the rigid channel or track and the insulating carrier 18 of the conductor assembly. In this respect, and as explained hereinbefore, the conductor assembly 17 fits rather loosely within the track component because of the dimensional differences between the depending legs 30 of the conductor assembly and walls 12 of the track intermediate the facing and spaced apart elements 31 and 32 thereof. Thus, because of the looseness of the fit between the track and conductor assembly 17 and because of the thinness of the flange 37, the flange is readily inserted into the space accommodating the same intermediate the various sections of the track web 14 and legs 12 and the respectively corresponding sections of the web 20 and legs 30 of the insulating carrier 18.

In certain instances it may be desirable to configurate the flange 37, as shown in FIG. 2, so as to facilitate insertion thereof intermediate the rigid track or channel and the conductor assembly 17 so that the entire extent of the flange edge does not confront these elements at the same time. In the form shown in FIG. 2, the flange 37 has a symmetrical configuration about a vertical center therethrough, and along one side the flange is provided with two forwardly extending points or projections 38a and 39a respectively located at the outer longitudinal edge of the flange web 40 and at the upper extremity of the flange leg 41a. Similarly, the flange 37 along the opposite side thereof is provided with prongs or projections 38b and 39b respectively located along the opposite longitudinal edge of the web 40 and along the upper extremity of the leg 41b. The projections 38 and 39 are evidently defined by notches formed by removing or eliminating portions of the axially extending flange 37. Thus, at least in part the projections 38a and 28 b are established by a generally V-shaped notch or recess 42 in the web 40.

The end connector 35 may be structurally the same as the dead end closure 34 except that it has an opening 44 in the transverse wall 45 thereof sufficiently large to freely pass the casing projection 13 of the live end closure 11 therethrough. The opening 44 has the aforementioned inverted somewhat U-shaped configuration conforming essentially to the shape of the longitudinally extending wall members of the track or channel generally bordering the convenience outlet 16 thereof, as shown in FIG. 5. The edge portion of the transverse wall 45 bordering the opening 44 therein is sufficiently wide to overlie the open-ended insulating carrier 18 and, more particularly, the ends of the conductors 25, 26 and 28 supported thereby so that the ends of these conductors will not be exposed, as is made evident in FIG. 5.

The end connector 35 is provided with a longitudinally extending flange (not shown since concealed in FIG. 5 by the transverse wall 45) that may be identical to the flange 37 associated with the dead end closure 34 heretofore described. The flange of the end connector 35 functions in the same manner as the flange 37 and is, therefore, telescopically engageable with the track assembly 10 and, in more particular terms, is inserted between the track or channel component and conductor assembly 17 in the same manner as the flanges 37 illustrated in FIGS. 3 and 4. The end connector 35 may be formed of the same material used for the dead end closure 34, and it may have the same general dimensions and be substantially identical therewith except for the opening 44 through the transverse wall 35. Accordingly, the longitudinal space occupied by the transverse wall 45 is very restricted and interfers in no way with the ordinary use of live end connectors irrespective of whether they are splice boxes (not shown) or live end closures 11 as shown in FIG. 5.

It will be evident that the dead end closure 34 and end connector 35 are similar in both structure and function, the first being used to close the terminal end of a track assembly that is not otherwise to be equipped with a live end closure 11 by means of which such track assembly is connnected to power supply lines or to another track assembly, and the second being used in association either with a splice box or with a live end closure 11 so as to provide a high dielectric material intermediate the ends of the conductors 25, 26 and 28 and the facing surface adjacent thereto of such a splice box or live end closure.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In a power distribution system, the combination of: an elongated open-ended track component defining a substantially continuous convenience outlet therealong and comprising an elongated channel having a plurality of longitudinally extending wall members generally bordering said outlet, and further comprising an elongated conductor assembly substantially coextensive in length with said channel and being supported thereby, said conductor assembly including an open-ended insulating carrier extending along said wall members and a plurality of conductors supported by said carrier in spaced apart relation electrically isolated one from another and terminating adjacent the open ends of said carrier; and an end insulator having both a transverse wall dimensioned to substantially abut an end of said track component and a flange projecting longitudinally from said transverse wall for telescopic engagement with said track component to relate said end insulator thereto and enable the same to insulate the ends of said conductors adjacent such end of said track component, the flange of said end insulator being relatively thin and generally corresponding to the configuration of said channel for telescopic insertion thereinto intermediate said channel and conductor assembly.

2. The power distribution system of claim 1 in which the longitudinally extending walls of said channel bordering said convenience outlet have an inverted somewhat generally U-shaped configuration, the transverse wall of said end insulator being generally planar and said flange thereof being normally disposed with respect thereto.

3. The power distribution system of claim 2 in which the transverse wall of said end insulator generally corresponds in external dimensions and in cross-sectional area to the ends of said track component so as to substantially cover an associated end thereof and define an end closure therefor.

4. The power distribution system of claim 2 in which the transverse wall of said end insulator generally corresponds in external dimensions to the ends of said track component and is open throughout its center portion to permit insertion therethrough of a splice box or other end connector into said track component.

5. In a power distribution system, the combination of: an elongated track component open at an end thereof and defining a convenience outlet therealong and comprising an elongated channel having a plurality of longitudinally extending wall members generally bordering said outlet, and further comprising an elongated conductor assembly supported by said channel and terminating at one end adjacent the open end thereof, said conductor assembly including an insulating carrier open at said terminating end thereof and extending along said wall members and further including a plurality of conductors supported by said carrier in spaced apart relation electrically isolated one from another and terminating at one of their ends adjacent the open end of said carrier; and an end insulator having both a transverse wall adjacent the open end of said track component in generally closing relation therewith and a flange projecting longitudinally from said transverse wall for telescopic engagement with said track component to relate said end insulator thereto and enable the same to insulate the ends of said conductors adjacent such open end of said track component, the flange of said end insulator being relatively thin and generally corresponding to the configuration of said channel for telescopic insertion thereinto intermediate said channel and conductor assembly.

6. The power distribution system of claim 5 in which the transverse wall of said end insulator generally corresponds in external dimensions and in cross-sectional area to the open end of said track component so as to substantially cover the same.

7. The power distribution system of claim 5 in which the transverse wall of said end insulator generally corresponds in external dimensions to the open end of said track component and is open throughout its center portion to permit insertion therethrough of a splice box or other end connector into said track component.

8. The power distribution system of claim 5 in which the flange of said insulator is provided with at least one longitudinally extending projection at the outer end thereof to facilitate insertion of said flange intermediate said channel and conductor assembly.

9. An end insulator for a power distribution system or the like having an open-ended track component defined by the combination of an elongated channel and a conductor assembly supported therein the latter of which includes an insulating carrier equipped with a plurality of conductors extending therealong, comprising: a transverse wall positionable adjacent the open end of such track component in generally closing relation therewith; and a flange projecting longitudinally from said transverse wall for telescopic engagement with the track component to supportingly relate said end insulator thereto with said transverse wall in such closing relation therewith, said flange being relatively thin for telescopic insertion into said track component intermediate said channel and conductor assembly.

10. The power distribution system of claim 9 in which the flange of said insulator is provided with at least one longitudinally extending projection at the outer end thereof to facilitate insertion of said flange intermediate such channel and conductor assembly.

* * * * *